No. 869,594. PATENTED OCT. 29, 1907.
W. G. STONE.
ANIMAL TRAP.
APPLICATION FILED APR. 7, 1906.
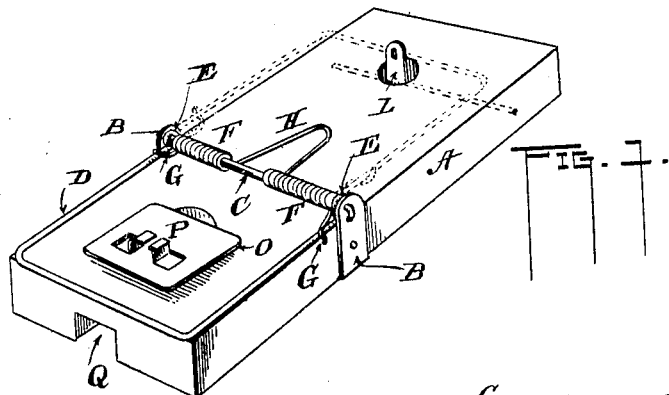
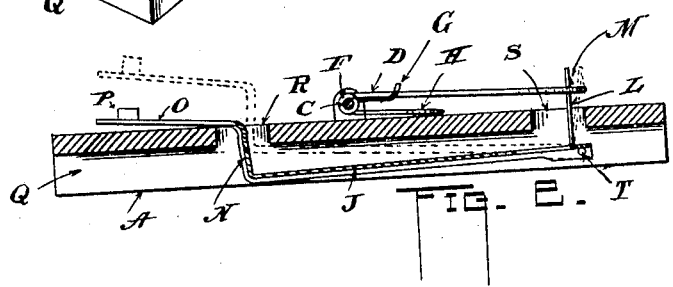
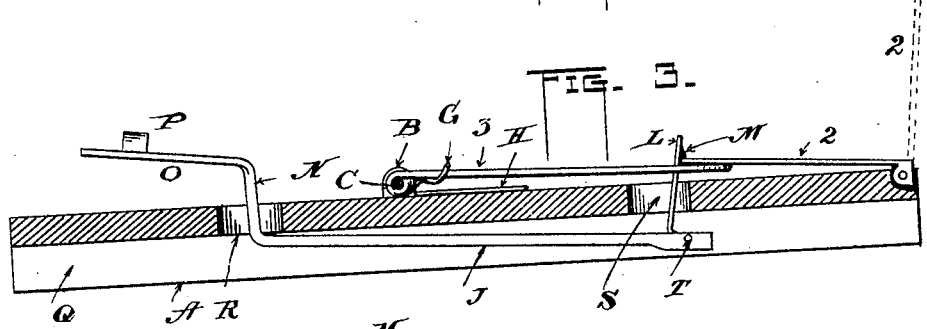
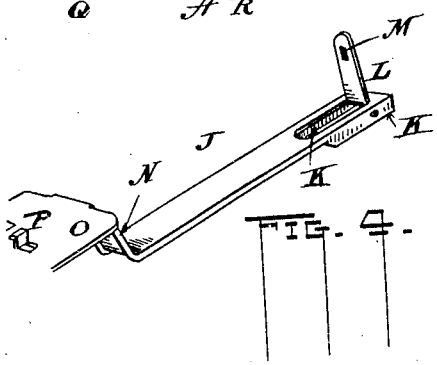
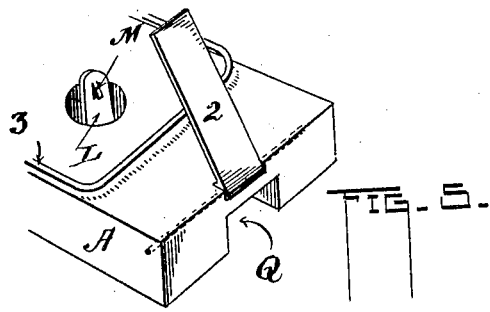
WITNESSES
INVENTOR
William G. Stone,
By L. M. Thurlow,
Atty.

UNITED STATES PATENT OFFICE.

WILLIAM G. STONE, OF KNOXVILLE, ILLINOIS, ASSIGNOR TO ENTERPRISE NOVELTY & MANUFACTURING COMPANY, OF KNOXVILLE, ILLINOIS.

ANIMAL-TRAP.

No. 869,594.

Specification of Letters Patent.

Patented Oct. 29, 1907.

Application filed April 7, 1906. Serial No. 310,559.

*To all whom it may concern:*

Be it known that I, WILLIAM G. STONE, a citizen of the United States, residing at Knoxville, in the county of Knox and State of Illinois, have invented certain new and useful Improvements in Animal-Traps; and I do hereby declare that the following is a full, clear, and exact description of the invention, which will enable others skilled in the art to which it appertains to make and use the same.

This invention pertains to mouse and rat traps though equally adapted for trapping other animals.

The object of the invention is to provide a trap that can be set without danger of injury to the person handling it.

A further object is to provide a trap that can be adjusted to obtain any degree of sensitiveness desired.

A still further object is to provide a peculiar form of treadle that can be easily and quickly adjusted for sensitiveness.

A further object is to provide a peculiar form of treadle that can be manipulated beneath the trap for setting the trap without danger of injury or discomfort to the person handling it.

In the appended drawing, Figure 1 is a perspective view of my improved trap. Fig. 2 is a longitudinal sectional elevation thereof. Fig. 3 is a similar view of a larger form of trap of a slightly modified form. Fig. 4 is a perspective view of my peculiar form of treadle. Fig. 5 is a perspective view of a portion of the form of trap shown in Fig. 3.

In the first two figures, A indicates the base of the trap having secured at opposite edges metal ears B between which is carried a pin C extending across said base. At D is a U-shaped loop or striking member of heavy wire having its extremities formed into eyes E which inclose the said pin near each ear B. The said pin is provided with a coil spring comprising the coils F F the ends of which terminate at and bear upon the extremities of the loop D described as shown. Said spring is formed preferably of one length of wire there being a loop or extension H formed between the two coils F which extends backward and bears upon the base A. When constructing the trap this spring is put under tension by holding the extremities G while the loop or extension H is turned about the pin C to tighten said coils, then by allowing said loop to rest upon the base a strong downward pressure is exerted upon the loop D to in turn keep a pressure of that member upon the base in the position shown in full lines in Fig. 1. Thus far the construction of the trap is not materially unlike other forms of this kind of trap, but my improvements may now be understood.

I provide a treadle J of peculiar form consisting of a metal strip having downwardly bent side portions K at its rear end. Struck up from the flat surface of the treadle also near the rear end is an ear or trigger L bent upward substantially to a vertical position. Near the upper extremity of said ear is a lip or tongue M formed by punching a portion of the metal outward toward the rear as plainly shown. The forward end of the treadle J is bent upward substantially at right angles to the body thereof as at N and is again bent with its extremity substantially parallel to the treadle body as at O. Said extremity is preferably enlarged, being provided with ears P struck up from the metal for use in holding the bait.

The base of the trap is provided with a longitudinal groove Q at the middle of the width of the body in the bottom thereof within which the treadle is designed to hang. In the top of the said body is a hole R near the front end and near the rear is a similar hole S. The treadle J is positioned by passing its rear end through the hole R from above then carrying that end backward into the groove Q, inserting its ear L up through the hole S. A pin T is passed through the side portions K described and also through the base thus forming a pivot for the treadle as will be understood. It is to be noted that this pivot or fulcrum is slightly behind the ear L so that a considerable vertical movement of the forward end of the treadle will impart but a slight movement to the said ear, although as a matter of fact if the fulcrum be directly beneath the ear substantially the same result would obtain. When the treadle is raised the ear will be carried rearward and if the loop D be turned back as shown in Fig. 2 against the pressure of the spring F F it can be made to remain under the lug M of the ear by bending the latter the required amount until the lug will just engage said loop. My purpose in constructing the treadle as described is that it may be reached beneath the base A by the fingers in the setting operation without discomfort or injury due to the accidental springing of the trap while setting it as results with the traps of this general form now in common use. Holding the base between the thumb and third and fourth fingers of the left hand the first or index finger may be used to raise the treadle beneath. At the same time the right hand is used to raise and carry the loop D back for engagement with the lug M of the ear L as has been described. When set the trap is placed in the desired location and left and in the mean time there has been no danger of any kind of the fingers being injured. This is especially important in using the traps of larger size such as are used for catching rats and the larger animals where it is absolutely dangerous to handle such traps. It will be seen, therefore, that my improvement is an advantage. A further advantage exists also, in that by imparting a slight bend to the ear L in either direction, as may be found necessary, the trap can be easily adjusted to be sprung at the very slightest touch. The trap is, therefore, made extremely sensitive yet easily adjusted for this sensitiveness.

In Figs. 3 and 5 is a slightly modified form of trap which is used for the larger rodents. By reason of the strong spring used for this purpose it becomes desirable to use a pivoted member 2 at the rear end of the base. In this form the loop 3 which corresponds to D in the other Figures 1 and 2, extends much farther back of the ear or trigger L while the member 2 is brought down upon it; the treadle being raised from beneath as before described, to set the trap. It is seen, therefore, that the said member 2 engages the lug M of the said ear L. This makes a better holding means for the loop 3, the trap being just as sensitive as the form first described.

1. A trap comprising a base, a treadle pivoted at its rear end therebeneath, its forward end arising upon the top of the trap for the purposes described, a trigger at the rear end of the treadle but forward of the fulcrum thereof, a lug on the rear side of said trigger, a spring actuated striking member carried by the base forward of the trigger its striking portion adapted, when set, to extend behind the trigger to engage the lug, the trigger adapted for adjustment to place its lug closer to or farther away from a position immediately above the fulcrum of the treadle.

2. A trap comprising a base having a longitudinal groove in its under surface, a treadle positioned in the groove, and pivoted at its rear end therewithin, its forward end extending upward upon the top of the trap, a substantially vertical trigger carried at said rear end of the treadle forward of its fulcrum, and adapted for adjustment with respect to the fulcrum of the treadle for providing more or less sensitiveness whereby a greater or less vertical movement of the treadle will spring the trap, a lug on the rear side of the trigger, and a spring actuated striking member positioned forward of the trigger, but extending rearward thereof for engaging the said lug substantially as described.

3. A trap comprising a base, a treadle pivoted at its rear end therebeneath, its forward end positioned to be touched by the animal, a vertically extending trigger at said rear end forward of the pivot, a lug on its rear side, and a striking member for engaging the lug, the trigger being adjustable toward or away from a position immediately above the pivot of the treadle by bending the same in a direction parallel to the length of the trap for imparting greater or less sensitiveness to cause the trap to be operated by more or less pressure upon its treadle.

4. A trap comprising a base, a treadle pivoted at its rear end therebeneath, its forward end being upturned and extended forward, there being an opening in the trap to permit the same to extend therethrough, a substantially vertical trigger struck up from the treadle just forward of the pivot of the latter and integral with said treadle, a lug struck up from said trigger on its rear surface, and a striking member inclined downward and rearward, and a striking member adapted, when set for release, to catch beneath the lug and hold the treadle raised, for action, the said trigger being capable of adjustment by bending it to carry the lug thereof toward or away from a position immediately above the fulcrum of the treadle when the latter is in said raised position as described.

5. A trap comprising a base, a groove in its under side extending longitudinally thereof, a treadle pivoted at one end within said groove the vertical movements of the treadle being confined to such groove, the former having an upward and forward bend terminating upon the top of the base, a substantially vertical trigger struck up from the treadle, a lug struck up from the trigger and extending downward and rearward therefrom, and a striking member adapted to extend behind the trigger and engage the lug when set for action, the trigger adapted for adjustment in a direction toward or away from the striking portion of the striking member when in its set position by bending said trigger for making the trap more or less sensitive.

6. In a trap, a spring actuated striking member, a support therefor, a treadle beneath the support but extending up through the said support at its forward end, the treadle being pivoted at its rear end within the support, there being a trigger on the treadle in the vicinity of the pivot and extending up through the support with which the striking-member engages substantially as set forth.

7. An article of manufacture consisting of a length of metal having an upward bend and a forwardly extending portion parallel to the main portion, and having an ear struck up therefrom at its rear end, the ear having a lug struck up therefrom, and downturned edges struck up at the edges of said rear end.

8. As an article of manufacture, a length of sheet metal having an upward and a forwardly extending forward end, ears struck up from the forwardly extending portion, an ear struck up at the rear end of the member, and a lug struck up from the rear side of the ear and extending downward and rearward therefrom.

9. As an article of manufacture, a length of sheet metal having an upward and a forwardly extending forward end, ears struck up from the forwardly extending portion, an ear struck up at the rear end of the member, a lug struck up from the rear side of the ear and extending downward and rearward therefrom and downturned edges at the rear end of the member, there being holes in the said downturned edges for the purposes described.

In testimony whereof I affix my signature, in presence of two witnesses.

WILLIAM G. STONE.

Witnesses:
E. J. ABERSOL,
L. M. THURLOW.